United States Patent
Blanke, Sr.

[11] Patent Number: 5,175,997
[45] Date of Patent: Jan. 5, 1993

[54] METHOD OF DETERMINING CATALYTIC CONVERTER EFFICIENCY ON COMPUTER CONTROLLED VEHICLES

[76] Inventor: John D. Blanke, Sr., P.O. Box 1178, Barrington, Ill. 60011

[21] Appl. No.: 806,727

[22] Filed: Dec. 12, 1991

[51] Int. Cl.[5] .................................................. F01N 3/22
[52] U.S. Cl. ........................................ 60/274; 60/277; 60/289; 73/118.1
[58] Field of Search ............... 60/274, 289, 290, 277; 73/118.1

[56] References Cited

U.S. PATENT DOCUMENTS

| | | |
|---|---|---|
| 4,030,349 | 6/1977 | Blanke et al. |
| 4,031,747 | 6/1977 | Blanke . |
| 4,116,053 | 9/1978 | Blanke . |
| 4,171,637 | 10/1979 | Blanke ............................ 73/118.1 |
| 4,622,809 | 11/1986 | Abthoff ............................ 60/276 |
| 4,841,765 | 6/1989 | Blanke . |
| 5,088,281 | 2/1992 | Izutani ............................ 60/274 |
| 5,105,651 | 4/1992 | Gutmann ........................ 73/118.1 |

Primary Examiner—Douglas Hart
Attorney, Agent, or Firm—McAndrews, Held & Malloy

[57] ABSTRACT

A method is disclosed for determining the efficiency of a catalytic converter for reducing levels of carbon monoxide (CO) and hydrocarbons (HC) in an exhaust stream of an internal combustion engine including a closed-loop control system. The closed-loop control system is used to provide a signal to a fuel mixture-control device which delivers known levels of oxygen ($O_2$) and carbon monoxide to the exhaust stream. The closed-loop control system is also used to externally control an air injection system which activates and deactivates the catalytic converter. A dilution factor is calculated and the catalytic converter efficiency is determined from the levels of carbon monoxide and hydrocarbons measured in the exhaust stream before and after the catalytic converter is activated by the air injection system.

5 Claims, 4 Drawing Sheets

METHOD OF DETERMINING CATALYTIC CONVERTER EFFICIENCY ON COMPUTER CONTROLLED VEHICLES

BACKGROUND OF THE INVENTION

The present invention is a method for determining the efficiency of a catalytic converter in an internal combustion engine on a vehicle equipped with a computerized closed-loop control system. The efficiency of the catalytic converter is measured by the reduction of the levels of carbon monoxide and hydrocarbons in the exhaust stream of the engine. Previous methods for determining the efficiency of a catalytic converter in an automotive exhaust system are not readily adaptable to the modern internal combustion engine. The present invention is particularly applicable to the field of automotive testing and repair where environmental and consumer protection legislation has been enacted which mandates the testing of catalytic converters.

Since 1967, legislative and market pressures have caused automobile engines and their associated control systems to become increasingly complicated. To meet the combined effects of stringent pollution controls and Corporate Average Fuel Economy (CAFE) requirements, automobile manufacturers have incorporated closed-loop controls using sensors, actuators and onboard computers. The closed-loop systems closely monitor and control the fuel mixture burned by the engine and are essential in permitting manufacturers to satisfy certification requirements mandated by the Environmental Protection Agency (EPA). However, repair of these closed-loop control systems has proved to be extremely difficult when one or more of the components fails or becomes marginally functional. As additional legislation is enacted, more and more vehicles will be equipped with complex computerized systems to monitor fuel consumption and emission levels.

Prior to 1967, a tune-up involved locating and replacing malfunctioning components which were either carburetor or ignition related. Failure modes were obvious and replacement or rebuilding of the components was the preferred corrective measure. By the middle 1970's, Inspection and Maintenance (I&M) programs had been introduced in a number of states such as California, New Jersey, New York and Arizona. I&M programs require that some method of testing be conducted to verify compliance with state mandated emission limits. Exhaust analyzers measuring levels of carbon monoxide and hydrocarbons were introduced to facilitate emission levels testing and to isolate carburetor from ignition problems. Carbon monoxide analysis is primarily used to set carburetion, while hydrocarbon analysis is used primarily to isolate ignition and timing problems.

The addition of the catalytic converter on 1975 and later model year vehicles increased the complexity of the inspection, maintenance and repair process. The catalytic converter masks the emission levels of carbon monoxide and hydrocarbons used by the technician to identify engine and emission system failures. The high signatures of carbon monoxide and hydrocarbons the technician previously relied on to isolate failed or malfunctioning components are effectively eliminated by a properly operating converter. Thus, although the catalytic converter is a powerful device for reducing emission levels, it makes adjustment of engine and exhaust system components on vehicles in need of repair or which have failed emission levels tests more difficult.

The development of analyzing equipment to measure oxygen levels and the incorporation of methods of intermittent misfire detection has eliminated much of the uncertainty encountered when adjusting carburetion and timing to tune a vehicle or to pass emission tests. An apparatus employing oxygen measurement and intermittent misfire detection is described in U.S. Pat. No. 4,030,349 entitled "IMPROVED ENGINE ANALYSIS APPARATUS" filed in the name of John D. Blanke et al., and U.S. Pat. No. 4,031,747 entitled "MISFIRE MONITOR FOR ENGINE ANALYSIS HAVING AUTOMATIC RESCALING" filed in the name of John D. Blanke. The '349 and '747 patents are incorporated by reference into the present disclosure in their entireties.

Catalytic converters are standard equipment on vehicles manufactured after 1975 and have become the major weapon in the reduction of emission levels. Unfortunately, however, existing catalytic converters cease to be effective when the catalyst is exhausted or becomes poisoned. Further, when the catalytic converter is operating effectively and reducing emission levels, it is simultaneously reducing the accuracy of testing and repair methods which rely on the same emission levels to evaluate the operation and integrity of engine and exhaust system components. Thus, while the converter solves one problem it creates another.

The technology of controlling emission levels remained relatively unchanged from 1975 until the 1980 model year. However in 1980, computerized closed-loop control systems were introduced to monitor fuel consumption and reduce emission levels on vehicles destined for the state of California. These closed-loop systems were designed to meet newly legislated fuel economy standards while satisfying federal and state mandated emission limits. Within a short time, computerized closed-loop control systems became standard equipment on most new vehicles. Today, almost all vehicles sold in the United States contain some form of computerized fuel management and emission levels control technology.

An apparatus and procedure for determining the efficiency of an automotive exhaust system including a catalytic converter for removing unburned carbon monoxide and hydrocarbons from the exhaust stream is disclosed in U.S. Pat. No. 4,116,053 entitled "THERMAL REACTOR/CATALYTIC CONVERTER EFFICIENCY DETERMINATION METHOD" filed in the name of John D. Blanke. However, the method described in the '053 patent is not readily adapted to modern vehicles equipped with computerized closed-loop control systems. In fact, in order to practice the '053 invention on a modern vehicle, the technician must disable the portion of the closed-loop control system which monitors the fuel mixture. If not disabled, the closed-loop control system automatically maintains the fuel mixture at 14.7:1 (air to fuel ratio) while the operator manually attempts to adjust the fuel mixture to create lean and rich operating conditions as taught by the '053 patent. Disabling the closed-loop control system causes the engine to run full rich or full lean depending on the design of the mixture-control device. To offset the effects of disabling the closed-loop control system on a carbureted engine, the idle mixture screws must be reset. The procedure to adjust the idle mixture screws entails removing the carburetor, drilling holes into it, driving out the anti-tamper caps covering the screws, reinstalling the carburetor and manually adjusting the screws as needed to induce a lean operating condition. Worse still, the technician must restore the engine to its original operating condition after completing the analysis of the exhaust system. More often than not, the technician can end up performing a complete tune-up on the engine after completing the test.

The method disclosed by the '053 patent is also not readily adapted to vehicles equipped with fuel-injection systems. For the same reason, to practice the '053 invention on a engine in which the fuel is directed to the cylinders by fuel injectors, the technician must physically alter the injector settings or replace the fuel injectors to induce a lean operating condition. As in the case of the carbureted vehicle, the technician can end up performing a complete tune-up on the engine.

Another problem is that the method disclosed by the '053 patent has proved to be extremely hazardous to the untrained or careless technician. In order to induce a rich operating condition in a carbureted engine, the '053 patent instructs the technician to inject propane into the air cleaner inlet or carburetor throat. Although the '053 patent suggests removal of the air cleaner filter and assembly before injecting the propane, technicians, in an attempt to save time and effort, routinely do not. As a result, propane is spilled onto the air cleaner filter and housing and the likelihood of explosion is greatly increased.

The '053 patent also instructs that any method for determining the efficiency of an exhaust system including a catalytic converter must be convenient, accurate and rapid to be of practical value. Components of the engine and exhaust system are typically hot when presented to the technician and testing requires the engine to be run continuously during the procedure. Fine adjustments to the idle mixture screws on carbureted engines and to the metering settings on fuel-injected engines are difficult and tedious to make as well as to restore. Thus, it is evident that any method of testing which requires extensive handling and modification of the engine and exhaust system components is inconvenient, imprecise and time-consuming.

Accordingly, it is an object of the present invention to provide a feasible method for determining the efficiency of a catalytic converter in an internal combustion engine that includes a computerized closed-loop control system.

Another object of the invention is to provide a method for determining the efficiency of an exhaust system which is readily adapted to vehicles in which the engine is either carbureted or fuel-injected.

Another object of the invention is to provide a method for determining the efficiency of a catalytic converter which does not require procedures which are inconvenient, inaccurate or time-consuming.

SUMMARY OF THE INVENTION

The above and other objects are accomplished in accordance with this invention by using the closed-loop control system of an internal combustion engine to adjust the fuel mixture while a technician measures the levels of oxygen, carbon monoxide and hydrocarbons in the exhaust. First, the closed-loop control system is used to cause the engine to run lean or rich as required by the method. Second, the closed-loop control system is used to disable and enable an air injection system which has the effect of activating and deactivating the catalytic converter when the engine is running rich. Preferably, an exhaust analyzer is combined with appropriate signal leads and a process controller to permit the efficiency of the catalytic converter to be determined without manual intervention by the technician other than connecting the analyzer and leads to the engine.

The present invention overcomes the complications and shortcomings of the method disclosed in the '053 patent. Unlike the '053 method, the procedure disclosed by the present invention uses the automatic closed-loop control system to adjust the fuel mixture. Therefore, it is unnecessary to disable the closed-loop control system and to make manual adjustments to the carburetor or the fuel-injection system to cause the engine to run lean, or to inject propane into the carburetor throat to cause the engine to run rich. In addition, the method disclosed by the present invention is the same for both carbureted and fuel-injected engines. Further, because the method of the present invention provides a false signal which only temporarily replaces the true signal to be processed by the closed-loop control system, the original operating characteristics of the engine are automatically restored after completion of the test. Thus, it is unnecessary for the technician to perform any of the procedures which reduce the accuracy and increase the time required to accomplish the '053 test.

In the method of the invention, an exhaust analyzer is used in conjunction with a signal regulator to send a false signal to a mixture-control device which adjusts the air to fuel ratio of the fuel mixture. The false signal may be manually selected by the technician or automatically input by the process controller. In addition, the false signal may be a regulated signal from an oxygen sensor, or the false signal may be a regulated signal from an on-board computer. In the instance where the false signal is an oxygen-sensor signal, the true oxygen-sensor signal, normally generated by the oxygen sensor, is interrupted and replaced by the false signal generated by the process controller of the test apparatus. The false signal is sent in place of the true signal to the on-board computer which processes the false signal and sends an additional signal to the mixture-control device. The signal sent to the mixture-control device is based on the false signal from the oxygen sensor and causes the engine to run lean or rich as directed by the method. In the case where the false signal is a mixture-control signal, the true mixture-control signal is interrupted and replaced by the false signal generated by the process controller of the test apparatus. Likewise, the false signal to the mixture-control device causes the engine to run lean or rich as directed by the method.

In the method of the invention it is preferred that the following steps be performed either manually or automatically. However, it will be noted that the order of the steps is not limited to the order described and that other sequences of the same steps may be employed. First, the analyzer and other apparatus must be calibrated. The analyzer is then used to sample the exhaust stream to verify that the engine is running at approximately idle RPM and normal operating temperature. If not, the problem is corrected. Next, the air injection system is disabled to begin determining the effect of the air injection system on the engine exhaust. The fuel mixture is then adjusted to cause the engine to run lean. The air injection system is reactivated and the emission level of oxygen is measured and recorded. The dilution effect of the air injection system on the emission levels of the raw exhaust is then computed from the emission level of oxygen recorded with the air injection system activated. Next, the air injection system is disabled, thereby deactivating the catalytic converter, and the fuel mixture is adjusted to cause the engine to run rich. The level of unburned hydrocarbons in the exhaust is then measured and recorded. The catalytic converter is reactivated by enabling the air injection system and the levels of unburned carbon monoxide and hydrocarbons are measured and recorded. The dilution effect of the air injection system is then removed from the emission levels of carbon monoxide and hydrocarbons recorded and the efficiency of the catalytic converter is calculated.

DETAILED DESCRIPTION OF THE INVENTION

Figure 1:
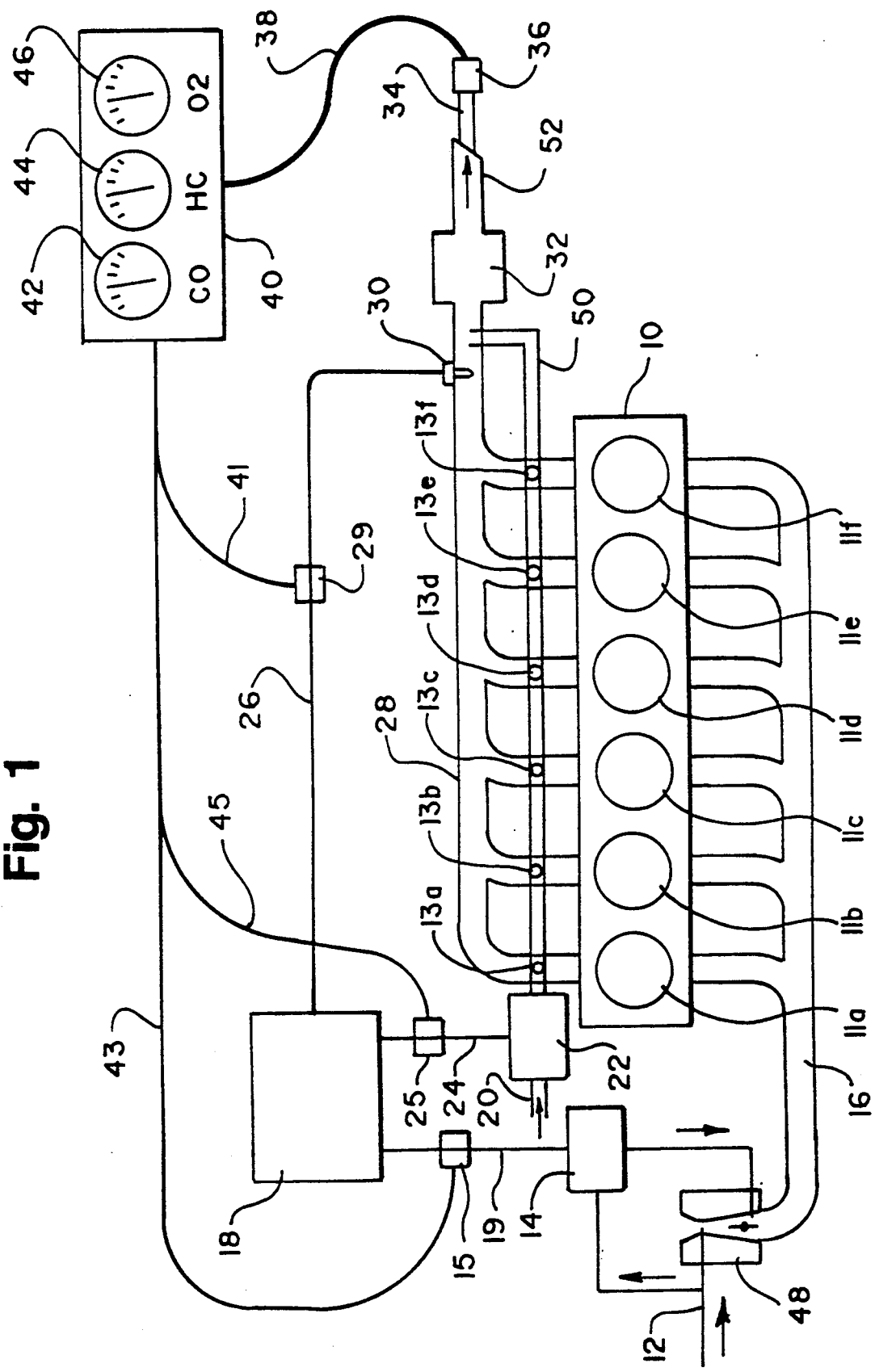
FIG. 1 is a schematic of a typical carbureted internal combustion engine including a carburetor, six cylinders, a closed-loop control system, intake and exhaust manifolds, an air injection system and a catalytic converter arranged for testing using the method of the invention.
Figure 2:
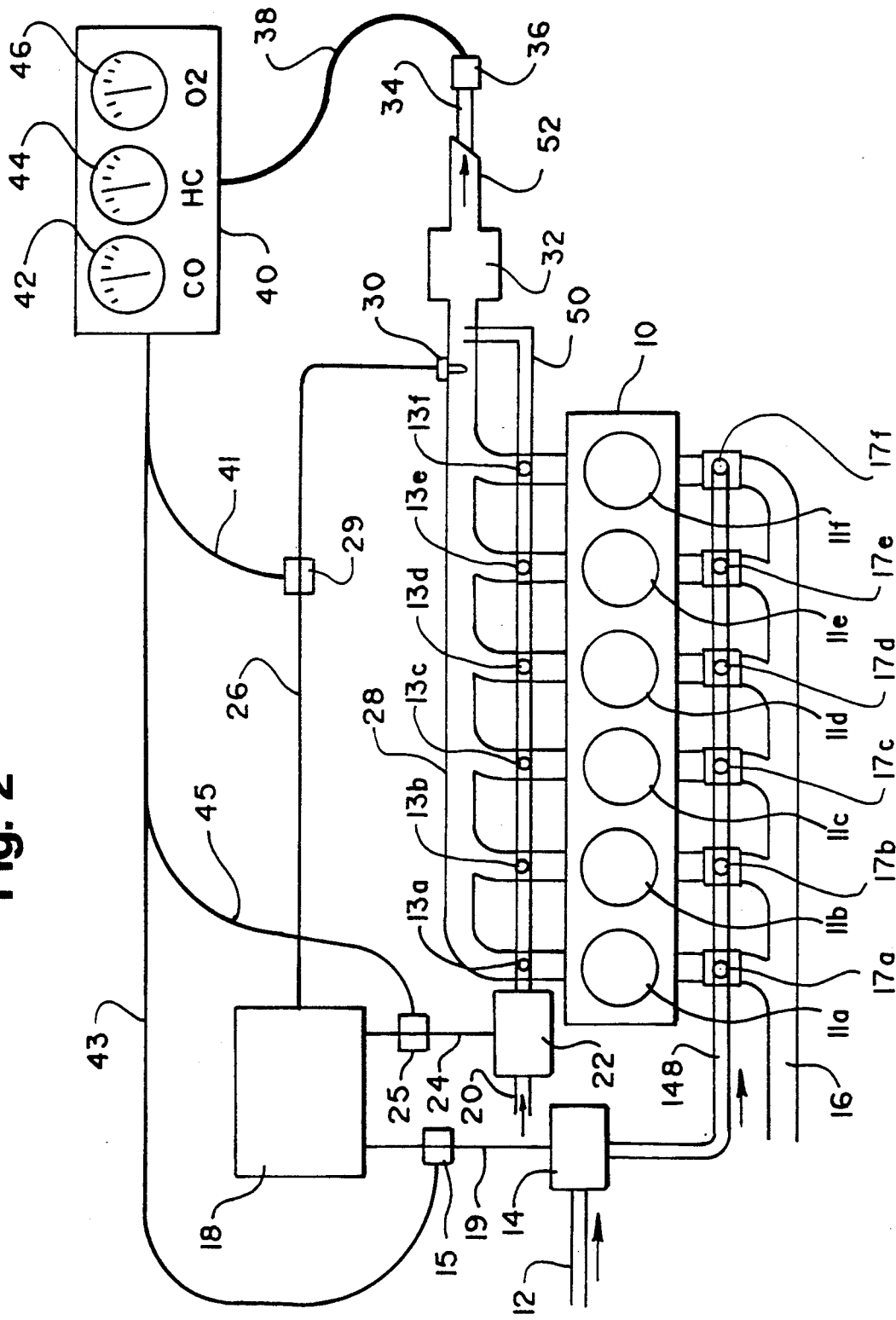
FIG. 2 is a schematic of a typical fuel-injected internal combustion engine including six port fuel injectors, six cylinders, a closed-loop control system, intake and exhaust manifolds, an air injection system and a catalytic converter arranged for testing using the method of the invention.
Figure 3:
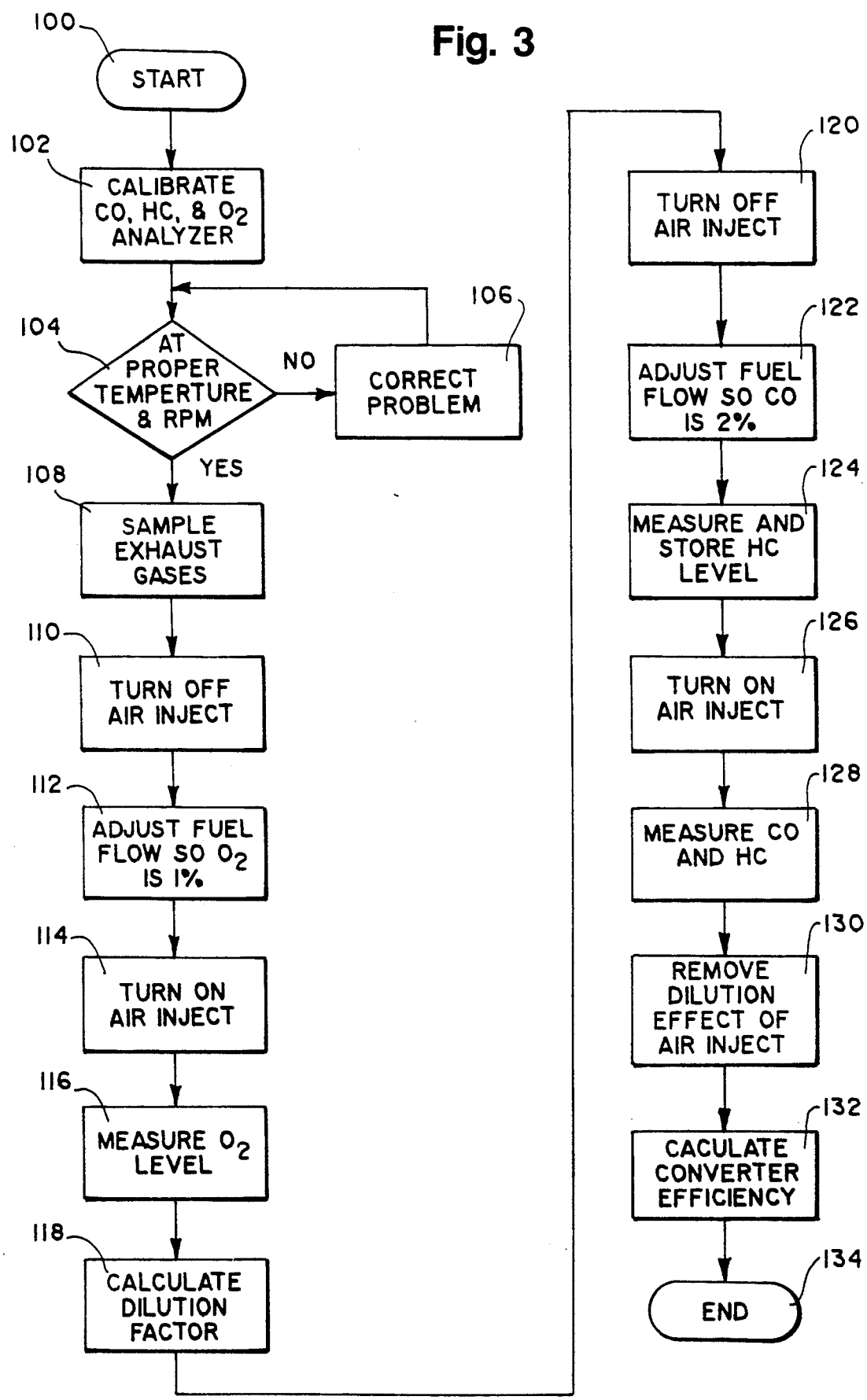
FIG. 3 is a flow diagram of the preferred steps of the present invention illustrating a method for determining the efficiency of a catalytic converter of the exhaust system on an engine including a computerized closed-loop control system.

FIG. 1 and FIG. 2 show typical carbureted and fuel-injected engines configured for determining the efficiency of a catalytic converter using the method of the present invention illustrated in FIG. 3. In FIGS. 1 and 2, a typical engine 10 has six cylinders 11($a-f$) in which combustion occurs. Fuel 12 is directed into a carburetor 48 (shown in FIG. 1) or through a line 148 to six port fuel injectors 17($a-f$) (shown in FIG. 2). An intake manifold 16 directs the fuel mixture into the cylinders 11($a-f$). After combustion, raw engine exhaust enters an exhaust manifold 28. Air 20 is added to the exhaust manifold 28 through six air injection ports 13($a-f$). Engine exhaust, including unburned carbon monoxide and hydrocarbons, exits the engine 10 through a tailpipe 52.

It should be noted that although FIGS. 1 and 2 illustrate carbureted and fuel-injected engines comprising six cylinders, the method of the invention is not limited by the number of cylinders of the engine or by the method of combustion. The invention is applicable to any internal combustion engine including a catalytic converter and means for combusting a fuel mixture which produces levels of unburned carbon monoxide and hydrocarbons in the exhaust stream of the engine.

Carbon monoxide and hydrocarbons present in the raw exhaust are partially reduced by thermal reaction in the exhaust manifold 28 to form carbon dioxide and water vapor. Additional air 20 is directed to the raw exhaust through an air injection line 50 and further dilutes emission levels. The remaining levels of carbon monoxide and hydrocarbons are reduced to their final levels as the exhaust passes through the catalytic converter 32. The final emission levels of carbon monoxide and hydrocarbons are directly related to the efficiency of the catalytic converter 32. Thus, a technician is able to determine the efficiency of the catalytic converter 32 by correcting the final emission levels of carbon monoxide and hydrocarbons for the dilution effect introduced by the air 20 added to the raw exhaust at the air injector ports 13($a-f$).

The fuel mixture is monitored by a closed-loop control system directed by an on-board computer 18. An oxygen sensor 30 determines whether the fuel mixture is rich, less than 14.7:1 pounds of air per pound of fuel, or lean, greater than 14.7:1, and sends an appropriate oxygen-sensor signal 26 to the on-board computer 18. Oxygen-sensor signal 26 is processed by the on-board computer 18 and converted into a mixture-control signal 19 which modulates a mixture-control device 14. A rich signal 26 from oxygen sensor 30 causes the on-board computer 18 to call for less fuel to be dispensed by the mixture-control device 14. A lean signal 26 from the oxygen sensor 30 causes the on-board computer 18 to call for more fuel to be dispensed through the mixture-control device 14. Constant monitoring of the oxygen-sensor signal 26 and adjustment of the mixture-control signal 19 by the on-board computer 18 causes the mixture-control device 14 to maintain an approximate 14.7:1 air to fuel ratio in the cylinders 11($a-f$). A 14.7:1 air to fuel ratio is known as a stoichiometric relation.

For engine operating conditions where a stoichiometric relation results in loss of performance, such as cold starting, acceleration or heavy load, extra fuel 12 is provided to the engine 10. Typically, the engine 10 employs an air injection system to help burn the additional levels of carbon monoxide and hydrocarbons created by these rich operating mixtures. An air-injector valve 22 opens and permits a large volume of air 20 to be pumped into the exhaust manifold 28 through air-injector ports 13($a-f$) and through air-injection line 50 ahead of the catalytic converter 32. Without the extra air, the elevated emission levels of carbon monoxide and hydrocarbons produced by combustion cannot be converted into carbon dioxide and water vapor due to the lack of oxygen present for reaction. With the extra air, carbon monoxide and hydrocarbons are maintained at or below the levels required by federal and state emissions laws.

The preferred test apparatus to support the method of the present invention includes a sampling probe 34, an exhaust sensor 36, and an exhaust analyzer 40. Exhaust analyzer 40 includes a carbon monoxide meter 42, a hydrocarbon meter 44, and an oxygen meter 46. Exhaust is removed from the tailpipe 52 through the sampling probe 34 and the exhaust sensor 36 converts the emission levels of carbon monoxide, hydrocarbon and oxygen measured to an electrical signal which is transmitted to the analyzer 40 through a signal cable 38. The analyzer 40 includes control and calculation means to support display of the emission levels of carbon monoxide, hydrocarbons and oxygen on meters 42, 44 and 46 respectively.

The preferred test apparatus also includes an oxygen-sensor signal regulator 29, a mixture-control signal regulator 15, an air-injector signal regulator 25, and corresponding electrical leads 41, 43 and 45. As shown in FIGS. 1 and 2, there are two ways to control the fuel mixture externally. In the first, the oxygen-sensor signal 26 is interrupted at the oxygen-sensor signal regulator 29 between the oxygen sensor 30 and the on-board computer 18. Oxygen-sensor signal regulator 29 sends a false signal to the on-board computer 18 which processes the signal and converts it into mixture-control signal 19. Mixture-control signal 19 then signals mixture-control device 14 to make the fuel mixture lean or rich as needed for the test.

In an alternative manner of accomplishing the same result, the mixture-control signal 19 is interrupted at the mixture-control signal regulator 15 between the on-board computer 18 and the mixture-control device 14. Mixture-control signal regulator 15 sends a false signal to the mixture-control device 14 which makes the fuel mixture lean or rich as needed for the test.

The on-board computer 18 also generates and sends an air-injector signal 24. The catalytic converter is activated and deactivated when the fuel mixture is rich by air 20 supplied by the air-injector valve 22 through air-injection line 50. To control the air injection system externally (activate and deactivate the catalytic converter when the fuel mixture is rich), the air-injector signal 24 is interrupted at air-injector signal regulator 25 between on-board computer 18 and air-injector valve 22. Air-injector signal regulator 25 sends a signal to the air-injector valve 22 which enables or disables the air injection system as needed for the test.

FIG. 3 shows the preferred steps to accomplish the method of the invention. Referring to FIG. 3, in step 102 the analyzer 40 is calibrated. In step 104 the engine RPM and temperature are noted to verify that the engine 10 is running at approximately idle RPM and normal operating temperature. If not, the problem is corrected in step 106. Once the engine is running properly, the exhaust is sampled in step 108 to verify proper operation of the analyzer 40.

In step 110 the air-injector signal regulator 25 signals the air-injector valve 22 to disable the air injection system. In step 112 the oxygen-sensor signal regulator 29 interrupts the oxygen-sensor signal 26 and signals the on-board computer 18 to cause the mixture-control device 14 to lean the fuel mixture until the level of oxygen in the exhaust at the tailpipe 52 is approximately one percent. Alternatively, as described earlier, the mixture-control signal regulator 15 interrupts the mixture-control signal 19 to cause the mixture-control device 14 to lean the fuel mixture as needed.

In step 114 the air-injector signal regulator 25 signals the air-injector control valve 22 to enable the air injection system. In step 116 the level of oxygen in the exhaust at the tailpipe 52 is measured and recorded using oxygen meter 46.

In step 118 the dilution factor is calculated. The dilution factor is the ratio of the volume of air injected into the exhaust stream to the total exhaust volume. The dilution factor is calculated from the level of oxygen recorded in step 116 and the equation:

$$DF = 1.05 - (0.05)(\text{level of } O_2 \text{ from step 116})$$

Figure 4:
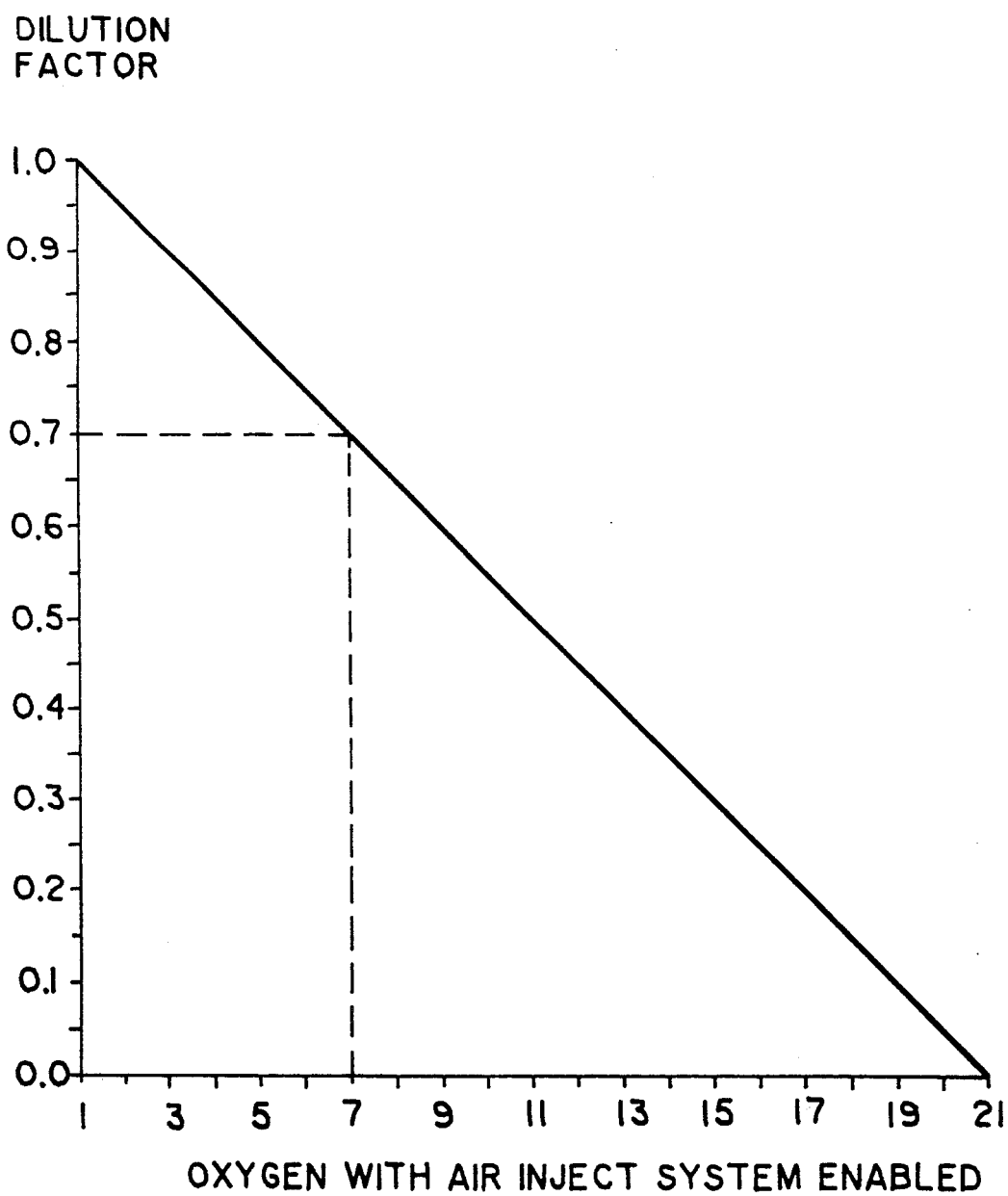
FIG. 4 is a plot of the dilution factor equation on a graph in which the vertical axis represents dilution factor and the horizontal axis represents the level of oxygen measured in percent with the air injection system enabled.

FIG. 4 shows the dilution factor equation plotted on a graph in which the vertical axis represents dilution factor and the horizontal axis represents the level of oxygen measured in percent with the air injection system enabled. As shown in FIG. 4, for a known level of oxygen, such as 7 percent, the corresponding dilution factor of 0.7 is determined by following the dashed vertical line in FIG. 4 upward from the horizontal axis until it intersects the line representing the dilution factor equation, and then following the horizontal dashed line toward the vertical axis and reading the dilution factor.

Because the levels of carbon monoxide and hydrocarbons are determined with the air injection system off and then on, the reduction of their levels due to dilution must be known. For example, if the total exhaust volume at the tailpipe 52 is made up of one-half air from the air injection system and one-half raw exhaust with a two percent carbon monoxide level, the level of carbon monoxide immediately ahead of the catalytic converter 32 would be only one percent. The raw exhaust carbon monoxide level is reduced by fifty percent due to the dilution factor of 0.5. Any calculation of the efficiency of the catalytic converter 32 must therefore be based on the one percent level of carbon monoxide remaining in the raw exhaust to be reacted by the catalytic converter 32.

In step 120 the operations of step 110 are repeated (the catalytic converter is deactivated). In step 122 the oxygen-sensor signal regulator 29 interrupts the oxygen-sensor signal 26 and signals the on-board computer 18 to cause the mixture-control device 14 to enrich the fuel mixture until the level of carbon monoxide in the exhaust at the tailpipe 52 is approximately two percent. Alternatively, as described earlier, the mixture-control signal regulator 15 interrupts the mixture-control signal 19 to cause the mixture-control device 14 to enrich the fuel mixture as needed.

With the air injection system disabled, (step 120) the catalytic converter 32 is deactivated and the levels of carbon monoxide and hydrocarbons measured in the exhaust at the tailpipe 52 are the same as the levels which exist immediately ahead of the catalytic converter 32.

In step 124 the level of hydrocarbons in the exhaust at the tailpipe 52 is measured and recorded using hydrocarbon meter 44. In step 126 the operations of step 114 are repeated (the catalytic converter is activated). In step 128 the levels of carbon monoxide and hydrocarbons in the exhaust at the tailpipe 52 are measured and recorded using carbon monoxide meter 42 and hydrocarbon meter 44.

In step 130 the dilution effect of the air injection system is removed. To correct the levels of carbon monoxide and hydrocarbons recorded in step 122 and step 124, the levels are multiplied by the dilution factor calculated in step 118.

In step 132 the efficiency of the catalytic converter 32 for removing unburned carbon monoxide (CO) and hydrocarbons (HC) from the exhaust is determined from the corrected levels of carbon monoxide and hydrocarbons calculated in step 130 and the levels of carbon monoxide and hydrocarbons recorded in step 128. The catalytic converter efficiency (in percent) for reducing levels of carbon monoxide and hydrocarbons in the exhaust is represented by the equations:

$$CO\% = \left(1.0 - \frac{\text{level of CO in step 128}}{\text{level of CO in step 130}}\right) \times 100$$

and, $$HC\ \% = \left(1.0 - \frac{\text{level of HC in step 128}}{\text{level of HC in step 130}}\right) \times 100$$

While a particular embodiment and application of the present invention has been shown, it will be understood, of course, that the invention is not limited thereto since modifications may be made thereto by those skilled in the art, particularly in light of the foregoing teachings. It is, therefore, contemplated by the appended claims to cover any such modifications as incorporate those features which come within the true spirit and scope of the present invention.

What is claimed is:

1. In a power generation system comprising (a) an internal combustion engine, said engine producing an exhaust stream, said exhaust stream passing through a catalytic converter, (b) means for injecting oxygen-containing air into said exhaust ream prior to passing through said catalytic converter, and (c) a closed-loop control system having an oxygen-sensor capable of generating a signal and a fuel mixture-control device responding to said oxygen-sensor signal, the method of determining the efficiency of said catalytic converter in removing carbon monoxide and hydrocarbons from said exhaust stream, said method comprising the steps of:
    (1) calibrating an exhaust gas analyzer, said analyzer measuring the relative amounts of carbon monoxide, oxygen and hydrocarbons in said exhaust stream exiting said catalytic converter;
    (2) sampling said exhaust stream exiting said catalytic converter using said analyzer;
    (3) disabling said air injection means;
    (4) providing a signal to said fuel mixture-control device to produce an oxygen level in said exhaust stream exiting said catalytic converter of about one percent;
    (5) enabling said air injection means;
    (6) determining the oxygen level in said exhaust stream exiting said catalytic converter using said analyzer;
    (7) disabling said air injection means;
    (8) providing a signal to said fuel mixture control device to produce a carbon monoxide level in said exhaust stream exiting said catalytic converter of about two percent;
    (9) determining the hydrocarbon level in said exhaust stream exiting said catalytic converter using said analyzer;
    (10) enabling said air injection means;
    (11) determining the carbon monoxide and hydrocarbon levels in said exhaust stream exiting said catalytic converter using said analyzer; and
    (12) calculating catalytic converter efficiency using the oxygen level determined in step (6), the hydrocarbon levels determined in steps (9) and (11), and the carbon monoxide levels produced in step (8) and determined in step (11).

2. The method of claim 1 wherein the signals are simulated oxygen-sensor signals.

3. The method of claim 1 wherein the signals are simulated mixture-control signals.

4. The method of claim 1 wherein said engine includes a carburetor responding to said fuel mixture-control device.

5. The method of claim 1 wherein said engine includes at least one port fuel injector responding to said fuel mixture-control device.

* * * * *